US011851293B2

(12) United States Patent
Graston et al.

(10) Patent No.: US 11,851,293 B2
(45) Date of Patent: Dec. 26, 2023

(54) TRAPDOOR REJECTION SUBSYSTEM FOR A CONVEYOR SYSTEM

(71) Applicant: Material Handling Systems, Inc., Mt. Washington, KY (US)

(72) Inventors: Carl David Graston, Sellersburg, IN (US); Thomas Anthony Hillerich, Jr., Louisville, KY (US); Paul Receveur, New Albany, IN (US)

(73) Assignee: Material Handling Systems, Inc., Mt. Washington (KY)

( * ) Notice: Subject to any disclaimer, the term of this patent is extended or adjusted under 35 U.S.C. 154(b) by 70 days.

(21) Appl. No.: 17/748,479

(22) Filed: May 19, 2022

(65) Prior Publication Data

US 2022/0371834 A1 Nov. 24, 2022

Related U.S. Application Data

(60) Provisional application No. 63/251,124, filed on Oct. 1, 2021, provisional application No. 63/191,179, filed on May 20, 2021.

(51) Int. Cl.
*B65G 47/96* (2006.01)
*B65G 43/08* (2006.01)
(Continued)

(52) U.S. Cl.
CPC .............. *B65G 47/96* (2013.01); *B07C 5/362* (2013.01); *B65G 43/08* (2013.01); *B65G 47/78* (2013.01);
(Continued)

(58) Field of Classification Search
CPC ........ B65G 47/96; B65G 43/08; B65G 47/78; B65G 2203/0208; B65G 2203/041; B65G 2201/0285; B07C 5/362
See application file for complete search history.

(56) References Cited

U.S. PATENT DOCUMENTS 4,676,359 A * 6/1987 Swapp ..................... B07C 5/36
198/747
6,854,588 B1 * 2/2005 Blattner ................. B65G 47/78
198/418.6
(Continued)

FOREIGN PATENT DOCUMENTS

CN 207876755 U 9/2018
CN 210884128 U 6/2020
(Continued)

OTHER PUBLICATIONS

Korean Intellectual Property Office, International Search Report and Written Opinion issued in corresponding Application No. PCT/US2022/030032 dated Sep. 1, 2022.

*Primary Examiner* — Gene O Crawford
*Assistant Examiner* — Lester Rushin, III
(74) *Attorney, Agent, or Firm* — Stites & Harbison, PLLC; David W. Nagle, Jr.; Gary N. Stewart

(57) ABSTRACT

A trapdoor rejection subsystem includes one or more trapdoor rejection mechanisms. Each trapdoor rejection mechanism is configured to be selectively transitioned between a closed position to support parcels and an open position to allow parcels identified as unconveyable to pass through the trapdoor rejection mechanism. Each trapdoor rejection mechanism includes a first door, a second door, and one or more actuators which can be selectively actuated to rotate the first door and the second door and transition the trapdoor rejection mechanism between the closed position and the open position. The trapdoor rejection subsystem can be utilized in a conveyor system in combination with one or more robot singulators, an upstream conveyor, a place conveyor, and a vision and control subsystem. Detection of unconveyable parcels and the transition of each trapdoor
(Continued)

rejection mechanism of the trapdoor rejection subsystem is controlled by the vision and control subsystem.

19 Claims, 7 Drawing Sheets

(51) Int. Cl.
    *B65G 47/78*     (2006.01)
    *B07C 5/36*     (2006.01)

(52) U.S. Cl.
    CPC ............ *B65G 2201/0285* (2013.01); *B65G 2203/0208* (2013.01); *B65G 2203/041* (2013.01)

(56) References Cited

U.S. PATENT DOCUMENTS

| | | | |
|---|---|---|---|
| 9,359,150 B2 * | 6/2016 | Jodoin | ............ B65G 47/90 |
| 10,646,898 B2 | 5/2020 | Hillerich, Jr. et al. | |
| 10,654,652 B1 | 5/2020 | Folickman et al. | |
| 10,994,309 B2 | 5/2021 | Hillerich, Jr. et al. | |
| 11,014,767 B2 | 5/2021 | Douglas et al. | |
| 11,082,890 B2 * | 8/2021 | Sirotkin | ............ H04W 24/10 |
| 11,643,769 B2 * | 5/2023 | Schechter | ............ B25J 15/0206 |
| | | | 414/13 |
| 11,795,013 B2 * | 10/2023 | Ueda | ............ B65G 47/32 |
| 2021/0122054 A1 | 4/2021 | Sun et al. | |
| 2021/0395023 A1 | 12/2021 | Patil et al. | |
| 2023/0220611 A1 * | 7/2023 | Schechter | ............ B07C 5/08 |
| | | | 209/606 |

FOREIGN PATENT DOCUMENTS

| | | |
|---|---|---|
| JP | 07-039824 A | 2/1995 |
| JP | 2006-142236 A | 6/2006 |

* cited by examiner

TRAPDOOR REJECTION SUBSYSTEM FOR A CONVEYOR SYSTEM

CROSS-REFERENCE TO RELATED APPLICATIONS

The present application claims priority to U.S. Patent Application Ser. No. 63/191,179 filed on May 20, 2021, and U.S. Patent Application Ser. No. 63/251,124, filed on Oct. 1, 2021, the entire disclosures of which are incorporated herein by reference.

BACKGROUND OF THE INVENTION

The present invention relates to the handling of parcels within a sorting or similar facility. In particular, the present invention relates to a trapdoor rejection subsystem which can be used in a conveyor system to selectively reject and redirect parcels.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility. One such piece of equipment useful for sorting the various parcels is a robot singulator, including a robotic framework (comprised of one or more arms) and an end effector, such as a vacuum-based end effector, that is mounted to the distal end of the robotic framework and configured to engage parcels. In this regard, a number of different robot singulators exist in the art, such as those disclosed in commonly assigned U.S. Pat. Nos. 10,646,898 and 10,994,309, which are incorporated herein by reference.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels. However, there are certain deficiencies in such prior art systems. For example, a surge in the volume of parcels may overwhelm the mechanical systems, and parcels may not be fully singulated. Non-singulated parcels may then interfere with subsequent processing, including downstream sorting.

U.S. Pat. Nos. 10,646,898 and 10,994,309 thus describe a system and method for identifying and transferring parcels from a bulk flow of parcels on the first conveyor (or "pick conveyor") to a singulated stream of parcels on the second conveyor (or "place conveyor"). Specifically, a robot singulator (or robot) receives parcels via the pick conveyor, engages each parcel, and then places it onto the place conveyor in response to instructions from a vision and control subsystem. However, due to cycle time limitations (i.e., the time required for each iterative transfer of a parcel from the pick conveyor to the place conveyor), conveyor systems including only a single robot singulator may not always be capable of providing the necessary throughput required to efficiently process large parcel volumes.

U.S. Patent Application Publication No. 2021/0395023, which is also incorporated herein by reference, describes another conveyor system, which includes multiple robot singulators (or robots) for transferring parcels from a bulk flow into a singulated stream of parcels. In such a conveyor system, a pick conveyor (which can include any form of chute, conveyor, or conveying surface, whether static or moving, that defines a "picking area") is configured to receive a bulk flow of parcels, and a place conveyor is positioned downstream of the pick conveyor. A first robot singulator (or first robot) and a second robot singulator (or second robot) work in parallel to transfer parcels within a picking area of the pick conveyor into a singulated stream on the place conveyor in response to instructions from a vision and control subsystem that is operably connected to the pick conveyor, the first robot, and the second robot.

In any of the above-described conveyor systems, for various reasons, the robots may not be able to engage certain parcels. For example, certain parcels may exceed size and/or weight limitations or otherwise may be characterized as "unconveyable." In other cases, the vision and control subsystem may not be able to accurately identify a parcel because of a "hidden" edge or other anomaly that makes it difficult to identify the parcel. Thus, there is a need for a rejection mechanism to handle those parcels that cannot be readily transferred from the first conveyor to the second conveyor.

U.S. Pat. No. 11,014,767, which is also incorporated herein by reference, describes a rejection mechanism for a conveyor system, which pushes parcels across and off of an upper surface of a conveyor. The rejection mechanism includes a linear actuator and a paddle mounted to the linear actuator for movement between a first position and a second position. The paddle includes a bracket portion, an upright portion, and a lateral wall portion. The lateral wall portion is configured to push parcels across a surface positioned below the lateral wall portion as the paddle is moved from the first position to the second position.

However, such a rejection mechanism may not be suitable for all applications, and thus, there remains a need for improved systems for rejecting parcels that are "unconveyable."

SUMMARY OF THE INVENTION

The present invention is a trapdoor rejection subsystem for a conveyor system.

A trapdoor rejection subsystem includes one or more trapdoor rejection mechanisms, with each trapdoor rejection mechanism configured to be selectively transitioned between a closed position and an open position. In use, each respective trapdoor rejection mechanism of the trapdoor rejection subsystem is ordinarily in the closed position to temporarily support parcels directed to the trapdoor rejection mechanism prior to subsequent transfer (e.g., by a robot singulator), but can selectively be transitioned to the open position to cause parcels identified as "unconveyable" to pass through the trapdoor rejection mechanism.

In some embodiments, each trapdoor rejection mechanism of the trapdoor rejection subsystem includes: a first door mounted to a first shaft; a second door mounted to a second shaft; and one or more actuators which can be selectively actuated to rotate the first shaft and the second shaft, and thus the first door and second door mounted thereto, to transition the trapdoor rejection mechanism between the closed position and the open position.

In some embodiments, each trapdoor rejection mechanism includes a single actuator. In such embodiments, each trapdoor rejection mechanism further includes a linkage assembly, which interconnects and facilitates simultaneous rotation of the first shaft and the second shaft. The linkage assembly of each trapdoor rejection mechanism includes: a first pivot arm mounted to the first shaft, such that in use, the first shaft is rotated in response to the rotation of the first pivot arm; a second pivot arm mounted to the second shaft, such that, in use, the second shaft is rotated in response to rotation of the second pivot arm; and a rod that connects the first pivot arm to the second pivot arm, such that, in use, rotation of the first pivot arm results in simultaneous rotation of the second pivot arm.

In some embodiments, each trapdoor rejection mechanism of the trapdoor rejection subassembly includes a frame to which the first shaft and the second shaft are mounted. In some embodiments, the frame defines a wall that partially surrounds the first door and the second door to prevent parcels transferred to the trapdoor rejection mechanism from inadvertently falling off of the trapdoor rejection mechanism. In some embodiments, the first door and the second door of each trapdoor rejection mechanism are positioned opposite of each other so that the first door and the second door move in opposite directions in response to first shaft and the second shaft being rotated in the same rotational direction.

An exemplary conveyor system, which includes a trapdoor rejection subsystem made in accordance with the present invention, includes: one or more robot singulators; an upstream conveyor for carrying a bulk flow of parcels; one or more trapdoor rejection mechanisms; a place conveyor; and a vision and control subsystem that is operably connected to the one or more robot singulators and the trapdoor rejection mechanism. The vision and control subsystem includes: a camera for acquiring one or more images of a picking area defined by the one or more trapdoor rejection mechanisms and any parcels located in the picking area; and a controller. The controller is configured to receive and process image data corresponding to the one or more images of the picking area acquired by the camera to determine whether a parcel located in the picking area is conveyable or unconveyable. In some implementations, a parcel may be considered to be unconveyable when the parcel in the picking area exceeds certain predetermined dimensions, is of a certain shape, is labeled with certain indicia, and/or has an obstructed edge or other anomaly which makes it difficult for the vision and control subsystem to identify the shape or dimensions of the parcel.

In response to determining the parcel in the picking area is conveyable, the controller is configured to communicate instructions to the one or more robot singulators which cause the one or more robot singulators to engage and transfer the parcel in the picking area from the picking area to the place conveyor. In response to determining the parcel in the picking area is unconveyable, the controller is configured to communicate instructions which cause one of the trapdoor rejection mechanisms to transition from the closed position to the open position, allowing unconveyable parcel to fall through and effectively removing the unconveyable parcel as a potential candidate for transfer by the one or more robots.

In some embodiments, a first door of the trapdoor rejection mechanism extends upwardly, and a second door of the trapdoor rejection mechanism extends downwardly, when the trapdoor rejection mechanism is in the open position. In one such embodiment, the trapdoor rejection mechanism is positioned adjacent to a distal end of the upstream conveyor, such that the first door of the trapdoor rejection mechanism defines a wall that blockades parcels from the bulk flow of parcels on the upstream conveyor when the trapdoor rejection mechanism is in the open position.

In some embodiments, the conveyor system also includes a hinge that is secured to the upstream conveyor and the trapdoor rejection mechanism to bridge a gap between the upstream conveyor and the trapdoor rejection mechanism, preventing parcels from falling through the gap.

In some embodiments, to alert operators of the conveyor system as to when a parcel is hung (i.e., resting on top) on a door of one of the trapdoor rejection mechanisms when the trapdoor rejection mechanism is in the open position, the conveyor system includes a sensor that is operably connected to the vision and control subsystem. The sensor is positioned to detect the presence of a parcel which has become hung on a door of the trapdoor rejection mechanism and to obtain readings regarding the same. In response to receiving a reading from the sensor indicating the presence of a hung parcel, the controller communicates instructions which cause a display operably connected to the vision and control subsystem to display a visual cue and/or a speaker operably connected to the vision and control subsystem to emit an audible cue. In some embodiments, the sensor is a photoelectric sensor. In some embodiments, the sensor is the camera of the vision and control subsystem.

DETAILED DESCRIPTION OF THE INVENTION

The present invention is a trapdoor rejection subsystem for a conveyor system.

Figure 1:
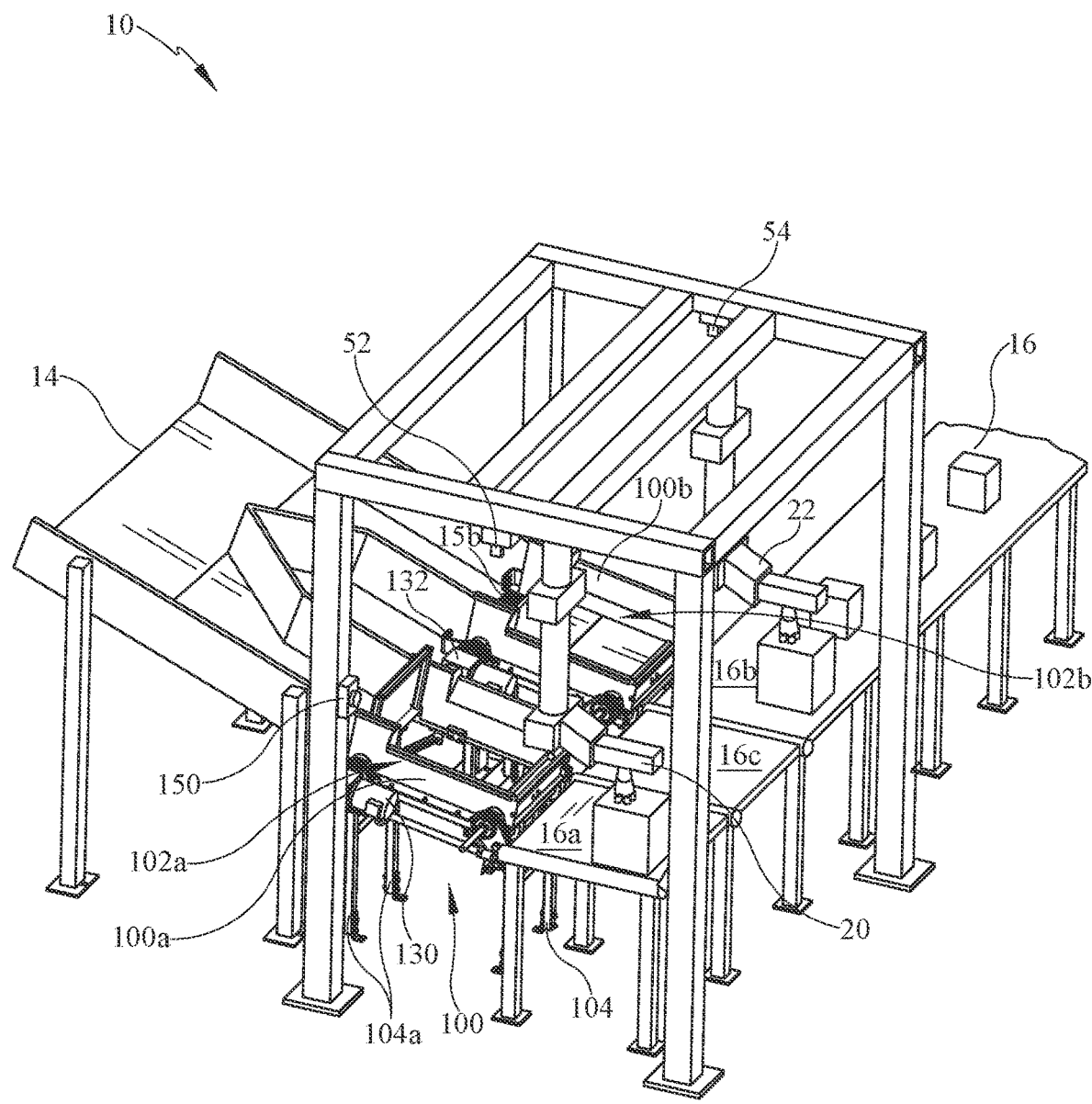
FIG. 1 is a perspective view of a conveyor system, including an exemplary trapdoor rejection subsystem made in accordance with the present invention.

FIG. 1 is a perspective view of a conveyor system 10, including an exemplary trapdoor rejection subsystem 100 made in accordance with the present invention.

It is important to recognize that, in the discussion that follows and in the claims of the present application, the term "parcel" is not intended to be limiting and can include any article, item, or object that may be loaded onto the conveyor system 10 and transferred, rejected, or otherwise processed in the manner specified within the present disclosure.

As shown in FIG. 1, the conveyor system 10 generally includes: an upstream conveyor 14 configured to receive and deliver a bulk flow of parcels (not shown), which, in this case, is a bulk feed chute that is split into two sections at its distal end to direct parcels to a first picking area 102*a* and a second picking area 102*b* that are defined by the trapdoor rejection subsystem 100, as further described below; a place conveyor 16 positioned downstream of the upstream conveyor 14, which, in this case, includes a first place area 16*a*, a second place area 16*b*, and an buffering conveyor 16*c* positioned between the first place area 16*a* and the second place area 16*b*; a first robot singulator 20 (or first robot 20) and a second robot singulator 22 (or second robot 22), which work in parallel to transfer parcels from the first picking area 102*a* and the second picking area 102*b* into a singulated stream on the place conveyor 16; and a vision and control subsystem 30 that is operably connected to the first robot 20 and the second robot 22, such that the vision and control subsystem 30 can communicate instructions to control operation of the first robot 20 and the second robot 22, along with other components of the conveyor system 10.

Referring still to FIG. 1, the conveyor system 10 further includes the exemplary trapdoor rejection subsystem 100, which comprises one or more trapdoor rejection mechanisms 100*a*, 100*b*. Each trapdoor rejection mechanism 100*a*, 100*b* of the trapdoor rejection subsystem 100 is configured to be selectively transitioned (or moved) between a closed position and an open position. In use, each respective trapdoor rejection mechanism 100*a*, 100*b* of the trapdoor rejection subsystem 100 is ordinarily in the closed position to temporarily support parcels directed to the trapdoor rejection mechanism 100*a*, 100*b* from the upstream conveyor 14 prior to being engaged by the first robot 20 or the second robot 22 and transferred to the place conveyor 16. If, however, a particular parcel located on a trapdoor rejection mechanism 100*a*, 100*b* of the trapdoor rejection subsystem 100 is identified as "unconveyable," the trapdoor rejection mechanism 100*a*, 100*b* on which the unconveyable parcel is positioned can be actuated and transitioned to the open position, which causes the unconveyable parcel to pass through the trapdoor rejection mechanism 100*a*, 100*b*. As a result, the unconveyable parcel is effectively rejected and redirected out of the stream of parcels to be processed by the first robot 20 and the second robot 22, thus effectively removing the unconveyable parcel as a potential candidate for transfer by the first robot 20 or the second robot 22.

In some implementations, unconveyable parcels rejected in the foregoing manner may be captured in a temporary storage bin (not shown) or redirected elsewhere via another conveyor (not shown) positioned below the trapdoor rejection subsystem 100. As further discussed below with reference to FIG. 6, the detection of "unconveyable" parcels and the transition of each trapdoor rejection mechanism 100*a*, 100*b* of the trapdoor rejection subsystem 100 may be regulated by the vision and control subsystem 30.

Referring still to FIG. 1, the trapdoor rejection subsystem 100 is positioned directly adjacent to the distal end 14*a* (FIG. 5) of the upstream conveyor 14 so that parcels offloaded from the upstream conveyor 14 are directed to the trapdoor rejection subsystem 100. In this exemplary embodiment, since the upstream conveyor 14 is split into two sections at its distal end, as noted above, the trapdoor rejection subsystem 100 actually comprises two separate trapdoor rejection mechanisms: a first trapdoor rejection mechanism 100*a*, which defines the first picking area 102*a* and is shown in the open position in FIG. 1; and a second trapdoor rejection mechanism 100*b*, which defines the second picking area 102*b* and is shown in the closed position in FIG. 1. In some embodiments, the trapdoor rejection subsystem 100 may be integrated into the upstream conveyor 14 by virtue of each trapdoor rejection mechanism 100*a*, 100*b* of the trapdoor rejection subsystem 100 either being secured to or integrally formed with the upstream conveyor 14. Furthermore, it should be readily apparent that fewer (one) or more trapdoor rejection mechanisms could be part of the trapdoor rejection subsystem 100 without departing from the spirit and scope of the present invention.

Figure 2A:
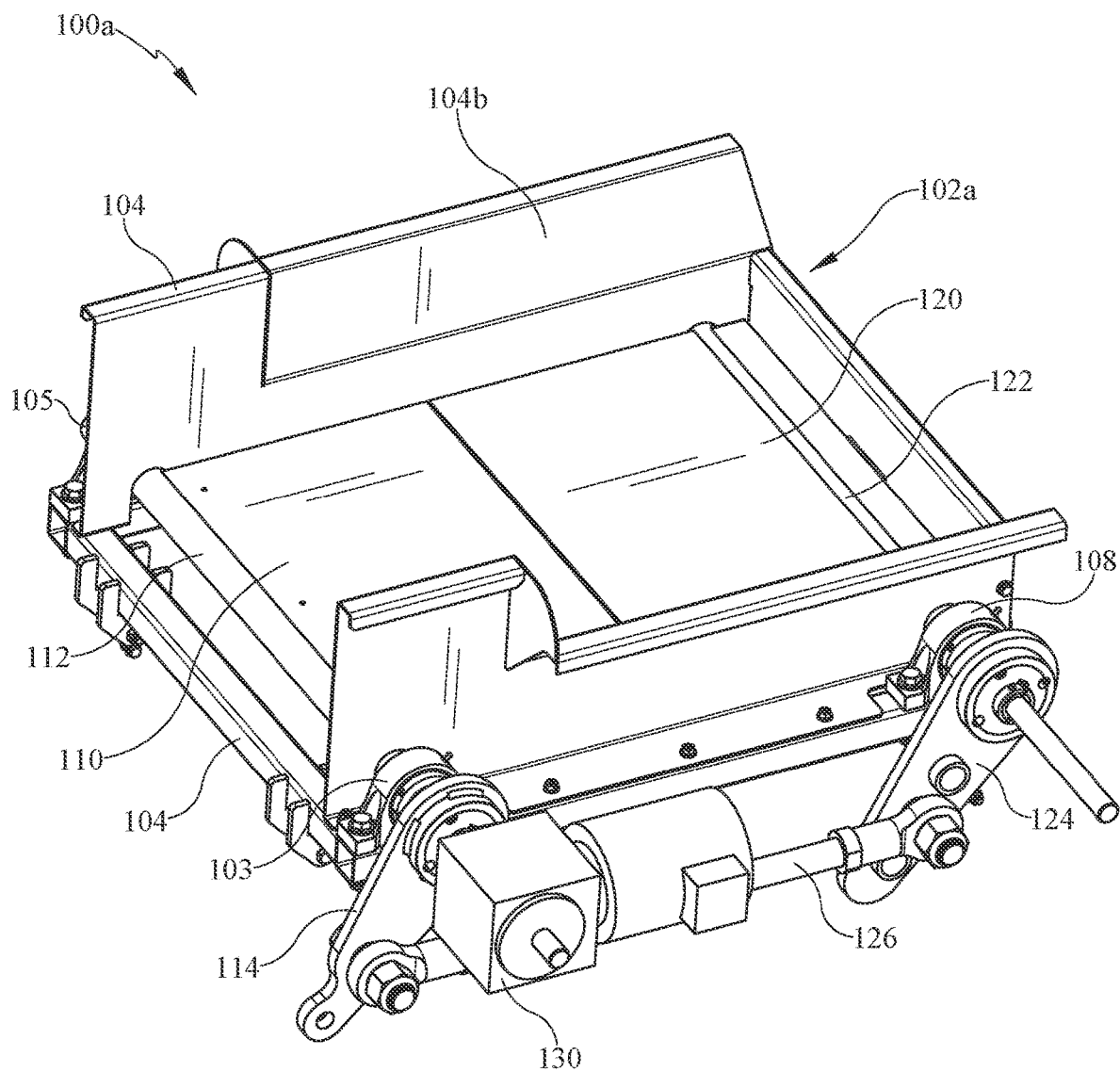
FIG. 2A is a perspective view of a trapdoor rejection mechanism of the exemplary trapdoor rejection subsystem of FIG. 1, with the trapdoor rejection mechanism in a closed position.
Figure 2B:
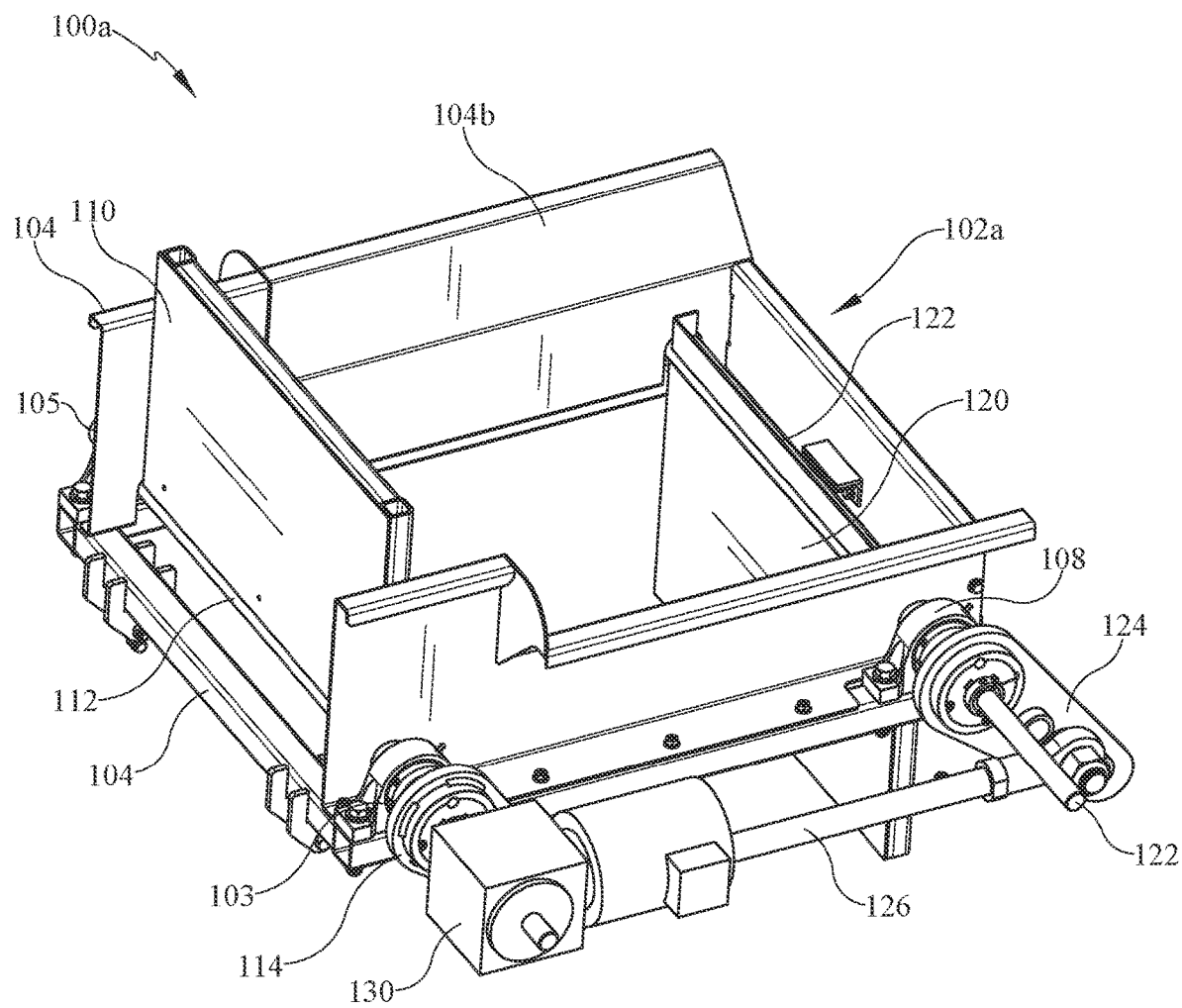
FIG. 2B is a perspective view of the trapdoor rejection mechanism similar to FIG. 2A, but with the trapdoor rejection mechanism in an open position.

FIGS. 2A and 2B are perspective views of the first trapdoor rejection mechanism 100*a* in the closed position and in the open position, respectively.

Figure 3:
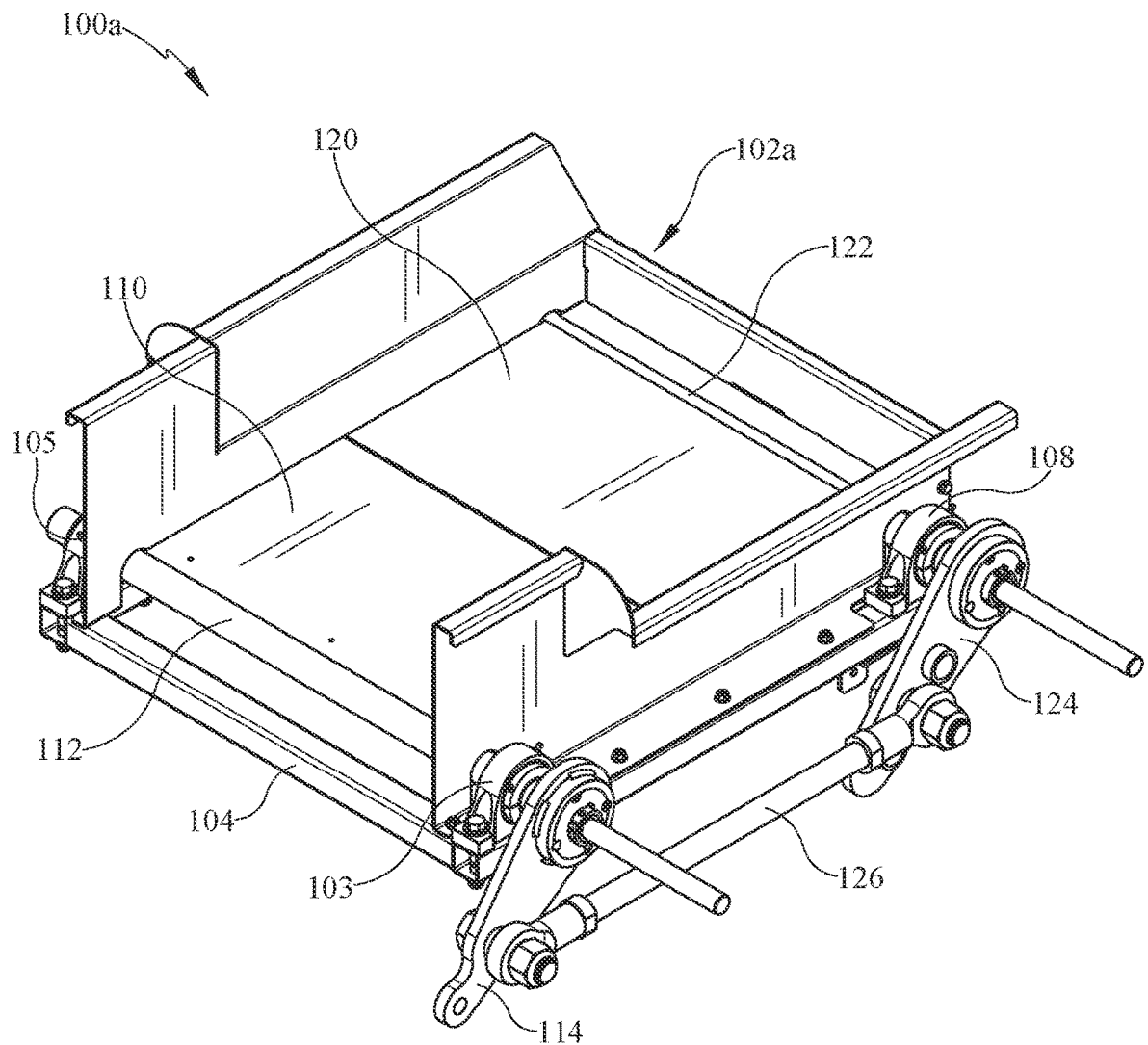
FIG. 3 is another perspective view of the trapdoor rejection mechanism similar to FIG. 2A, but with an actuator of the trapdoor rejection mechanism removed.

FIG. 3 is a perspective view of the first trapdoor rejection system 100*a* similar to FIG. 2A, but with an actuator 130 of the first trapdoor rejection mechanism 100*a* removed to better illustrate other components of the first trapdoor rejection mechanism 100*a*

Referring now to FIGS. 2A, 2B, and 3, the first trapdoor rejection mechanism 100*a* generally includes a first door 110, a second door 120, and one or more actuators 130 which can be selectively actuated to rotate the first door 110 and the second door 120 to transition the first trapdoor rejection mechanism 100*a* between the closed position (FIGS. 2A and 3) and the open position (FIG. 2B). Specifically, in this exemplary embodiment, the first trapdoor rejection mechanism 100*a* includes two doors: a first door 110 that is mounted to a first shaft 112, such that rotation of the first shaft 112 results in rotation of the first door 110; and a second door 120 that is mounted to a second shaft 122, such that rotation of the second shaft 122 results in rotation of the second door 120. Thus, by rotating the first shaft 112 and the second shaft 122, the first door 110 and the second door 120 can be rotated to transition the first trapdoor rejection mechanism 100*a* between the closed position (FIGS. 2A and 3) and the open position (FIG. 2B). In this regard, in the closed position, the first door 110 and the second door 120 collectively form a surface in the first picking area 102*a*, upon which parcels directed off of the upstream conveyor 14 can temporarily rest prior to either being transferred to the place conveyor 16 or passed through the first trapdoor rejection mechanism 100*a* as a result of the first trapdoor rejection mechanism being transitioned to the open position.

Referring still to FIGS. 2A, 2B, and 3, in this exemplary embodiment, the first trapdoor rejection mechanism 100*a* further includes a frame 104 to which the first shaft 112 and the second shaft 122 are mounted via a first pair of bearings 103, 105 and a second pair of bearings 108 (one of which is shown in FIGS. 2A, 2B, and 3), respectively. To prevent translational movement of the first shaft 112 and the second shaft 122 while still permitting rotation thereof during operation of the first trapdoor rejection mechanism 100*a*, in this exemplary embodiment, the first pair of bearings 103, 105 and the second pair of bearings 108 are pillow block bearings. To support the weight of the various components of the first trapdoor rejection mechanism 100*a*, the frame 104 may include a set of legs 104*a* (FIG. 1) and/or be mounted to another structure, such as the upstream conveyor 14. In this regard, the frame 104, in some implementations, may serve as a convenient point of attachment which facilitates integration of the first trapdoor rejection mechanism into upstream conveyor 14. To prevent parcels from inadvertently falling off of the first trapdoor rejection mechanism 100*a* as they are offloaded from the upstream conveyor 14, in this exemplary embodiment the frame 104 defines a wall 104b that partially surrounds the first door 110 and the second door 120.

Referring still to FIGS. 2A, 2B, and 3, in this exemplary embodiment, the first trapdoor rejection mechanism 100a further includes a linkage assembly which interconnects and facilitates simultaneous rotation of the first shaft 112 and the second shaft 122. The linkage assembly includes: a first pivot arm 114, a second pivot arm 124, and a rod 126 that interconnects the first pivot arm 114 and the second pivot arm 124. The first pivot arm 114 is mounted to the first shaft 112, such that the first shaft 112 is rotated in response to rotation of the first pivot arm 114 and vice versa. Similarly, the second pivot arm 124 is mounted to the second shaft 122, such that the second shaft 122 is rotated in response to rotation of the second pivot arm 124 and vice versa. The rod 126 is connected to the first pivot arm 114 and the second pivot arm 124, such that rotation of the first pivot arm 114 results in simultaneous rotation of the second pivot arm 124, and vice versa. Specifically, in this exemplary embodiment, the rod 126 is connected to the first pivot arm 114 and the second pivot arm 124 so that the first pivot arm 114 and the second pivot arm 124 simultaneously rotate in the same rotational direction (i.e., clockwise or counterclockwise) as each other. The first door 110 and the second door 120 are positioned opposite of each other and mounted to opposing ends of the frame 104, such that the distal edge 110a of the first door 110 and the distal edge 120a of the second door 120 are adjacent to each other, and the first shaft 112 and the second shaft 122 are parallel to each other. Accordingly, as a result of such construction and the linkage assembly interconnecting the first shaft 112 and the second shaft 122, rotation of the first pivot arm 114 and the second pivot arm 124 in the same rotational direction causes the first door 110 and the second door 120 to move (or open) in different directions, as evidenced by viewing FIGS. 2A and 2B in sequence. Specifically, in this exemplary embodiment, one door moves up while the other door moves down as the first shaft 112 and the second shaft 122 are rotated in the same rotational direction.

As shown in FIG. 2B, in this exemplary embodiment, the first door 110 is in a vertical, upwardly extending position, and the second door 120 is in a vertical, downwardly extending position, when the first trapdoor rejection mechanism 100a is in the open position, the importance of which is further described below.

Referring now specifically to FIGS. 2A and 2B, in this exemplary embodiment, the first trapdoor rejection mechanism 100a comprises a single actuator 130, which, in this case, is a gear motor mounted to drive rotation of the first pivot arm 114 in two rotational directions (i.e., clockwise and counterclockwise). Accordingly, in this exemplary embodiment, the first shaft 112 is operably connected to the actuator 130 via the first pivot arm 114. Actuation of the actuator 130 results in rotation of the first pivot arm 114, which, of course, causes rotation of the first shaft 112 to transition the first door 110 from a closed position (FIG. 2A) to an open position (FIG. 2B), or vice versa. Furthermore, as a result of the connection of the first pivot arm 114 and the second pivot arm 124 via the rod 126, actuation of the actuator 130 also results in rotation of the second pivot arm 124, which, of course, causes rotation of the second shaft 122 to transition the second door 120 from a closed position (FIG. 2A) to an open position (FIG. 2B), or vice versa. Of course, the gear motor is only one of many known actuators that could be used to rotate the first shaft 112 and the second shaft 122 in the above-described manner. Other suitable actuators include, but are not limited to, pneumatic cylinders, hydraulic cylinders, and/or electric linear actuators. Furthermore, although the actuator 130 is primarily referred to herein as driving rotation of the first pivot arm 114, alternative embodiments are contemplated in which the actuator 130 is mounted to drive rotation of the first shaft 112 directly The second trapdoor rejection mechanism 100b is of identical construction and thus functions and can be controlled in the same manner as described herein for the first trapdoor rejection mechanism 100a.

Figure 6:
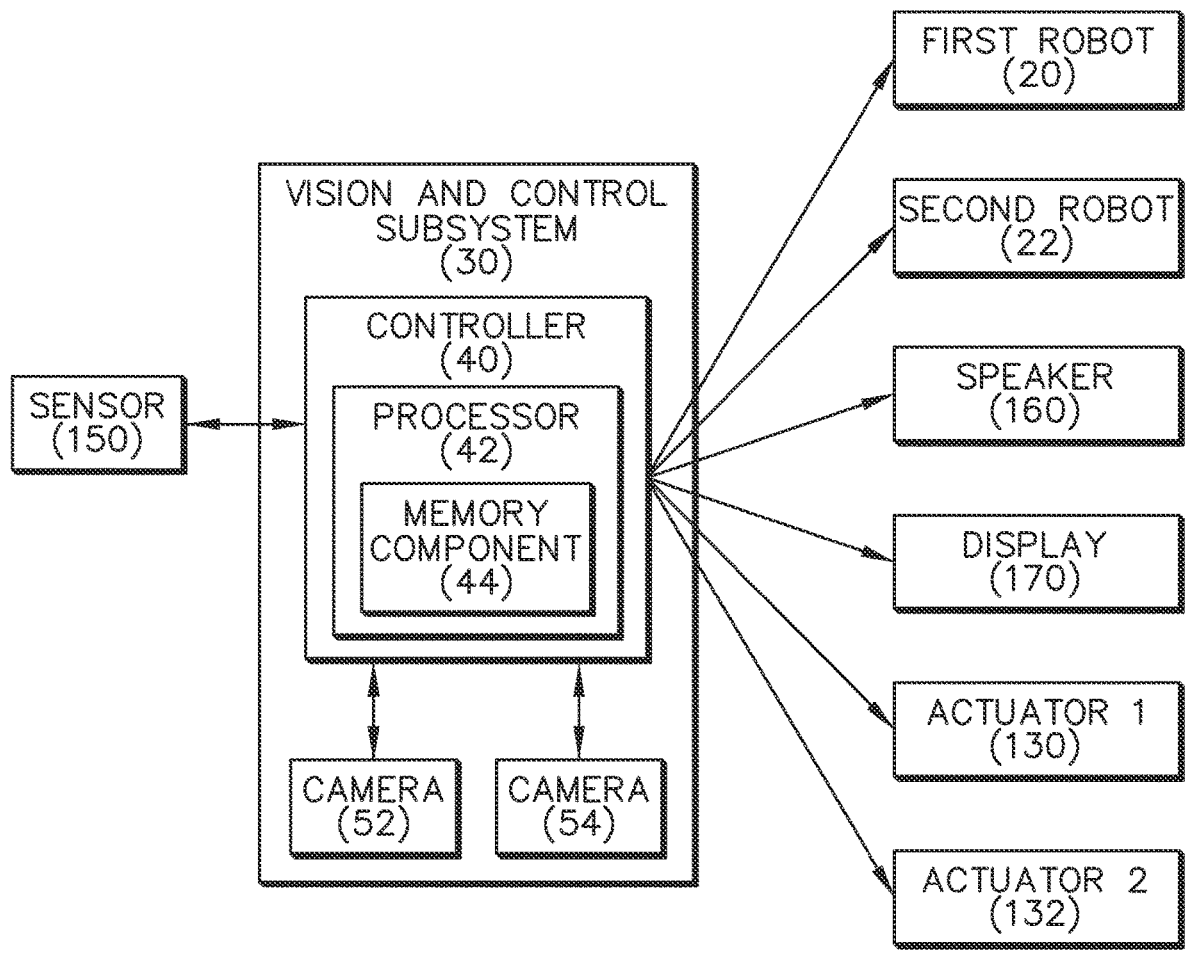
FIG. 6 is a schematic diagram of a vision and control subsystem, along with certain components of the conveyor system and the exemplary trapdoor rejection subsystem which may be controlled by the vision and control subsystem and/or provide information to the vision and control subsystem.

FIG. 6 is a schematic diagram of the vision and control subsystem 30, along with certain components of the conveyor system 10 and trapdoor rejection subsystem 100 which may be controlled by the vision and control subsystem 30 and/or provide information to the vision and control subsystem 30.

Referring now to FIGS. 1 and 6, the vision and control subsystem 30 generally includes: one or more cameras 52, 54 that are configured to acquire two-dimensional and/or three-dimensional images of the first picking area 102a, the second picking area 102b, and any parcels located therein; and a controller 40. In this exemplary embodiment, the vision and control subsystem 30 includes two cameras: a first camera 52, which is positioned so that the field of view of the first camera 52 includes the first picking area 102a; and a second camera 54, which is positioned so that the field of view of the second camera 54 includes the second picking area 102b. The first camera 52 and the second camera 54 are operably connected to the controller 40, such that the controller 40 can communicate instructions to, and receive image data from, the first camera 52 and the second camera 54. The first camera 52 and the second camera 54 may be selectively activated to capture images of the first picking area 102a and the second picking area 102b, respectively, in response to instructions (or signals) communicated from the controller 40 or obtain images substantially continuously. In this exemplary embodiment, the images captured by the first camera 52 and the second camera 54 are communicated to the controller 40 as image data. In other words, the images captured by the first camera 52 and the second camera 54 are not processed prior to being communicated to the controller 40. Embodiments are, however, contemplated in which the first camera 52 and the second camera 54 are individual components of one or more larger vision units, as disclosed, for example, in U.S. Patent Application Publication No. 2021/0395023, which, again, is incorporated herein by reference. In such embodiments, the images acquired by the first camera 52 and the second camera 54 may be processed locally on one or more vision units to generate the image data which is subsequently communicated to the controller 40 for processing. Suitable cameras for use in the vision and control subsystem 30 include three-dimensional image sensors manufactured and distributed by ifm Effector Inc. of Malvern, Pennsylvania.

Referring still to FIGS. 1 and 6, the controller 40 includes a processor 42 configured to execute instructions stored in a memory component 44 or other computer-readable medium. In this exemplary embodiment, the controller 40 is a programmable logic controller or other industrial controller. The controller 40 is connected to the first camera 52 and the second camera 54 to facilitate the transmission of image data from the first camera 52 and the second camera 54 to the controller 40 either by wired connection (e.g., Ethernet connection) or by wireless connection (e.g., via a network) using known interfaces and protocols. The image data received from the first camera 52 and the second camera 54 is processed by the controller 40 to determine whether a parcel located in the picking area to which the image corresponds is "unconveyable" and should be removed as a candidate for transfer by the first robot 20 or the second robot 22. In this exemplary implementation, a parcel is considered to be "unconveyable" when the parcel exceeds certain predetermined dimensions, is of a certain shape, is labeled with certain indicia, and/or has an obstructed (or "hidden") edge or other anomaly which makes it difficult for the vision and control subsystem 30 to identify the shape or dimensions of the parcel. It is appreciated, however, that the criteria by which a parcel is deemed "unconveyable" may be modified to better accommodate different sorting applications and/or environments without departing from the spirit and scope of the present invention.

Referring still to FIGS. 1 and 6, the controller 40 is also operably connected to the actuators 130, 132 of the first trapdoor rejection mechanism 100a and the second trapdoor rejection mechanism 100b, such that the actuator 130 of the first trapdoor rejection mechanism 100a and the actuator 132 of the second trapdoor rejection mechanism 100b can be selectively actuated in response to instructions (or signals) communicated from the controller 40. Upon determining a parcel located in the first picking area 102a is unconveyable, the controller 40 communicates instructions to the first trapdoor rejection mechanism 100a which actuates the actuator 130 of the first trapdoor rejection mechanism 100a and transitions the first trapdoor rejection mechanism 100a to the open position. Similarly, upon determining a parcel located in the second picking area 102b is unconveyable, the controller 40 communicates instructions to the second trapdoor rejection mechanism 100b which actuates the actuator 132 of the second trapdoor rejection mechanism 100b and transitions the second trapdoor rejection mechanism 100b to the open position. If, however, the parcel in the first picking area 102a and the parcel located in the second picking area 102b are not determined to be unconveyable (i.e., a determination that the parcel is conveyable), the vision and control subsystem 30 communicates instructions to either the first robot 20 or the second robot to 22 to transfer such parcels to the first place area 16a or the second place area 16b of the place conveyor 16.

Referring again to FIG. 1, in this example embodiment, the place conveyor 16 is actually comprised of multiple conveyors, each of which can be selectively activated to transfer singulated parcels downstream for subsequent processing. Specifically, in this exemplary embodiment, the place conveyor 16 includes: a first conveyor which defines the first place area 16a; a second conveyor which defines the second place area 16b; and a third (or buffering) conveyor 16c positioned between the first conveyor and the second conveyor. The buffering conveyor 16c can be selectively activated to regulate the rate at which parcels offloaded from the first place area 16a are subsequently transferred to the second place area 16b.

Referring again to FIG. 6, as noted above, in this exemplary embodiment, the controller 40 is also operably connected to the first robot 20 and the second robot 22, such that the controller 40 can communicate instructions (or signals) to control operation of the first robot 20 and the second robot 22. Although not shown in FIG. 6, the controller 40 may also be operably connected to the buffering conveyor 16c, such that the controller 40 can communicate instructions (or signals) to control operation of the buffering conveyor 16c.

Figure 4:
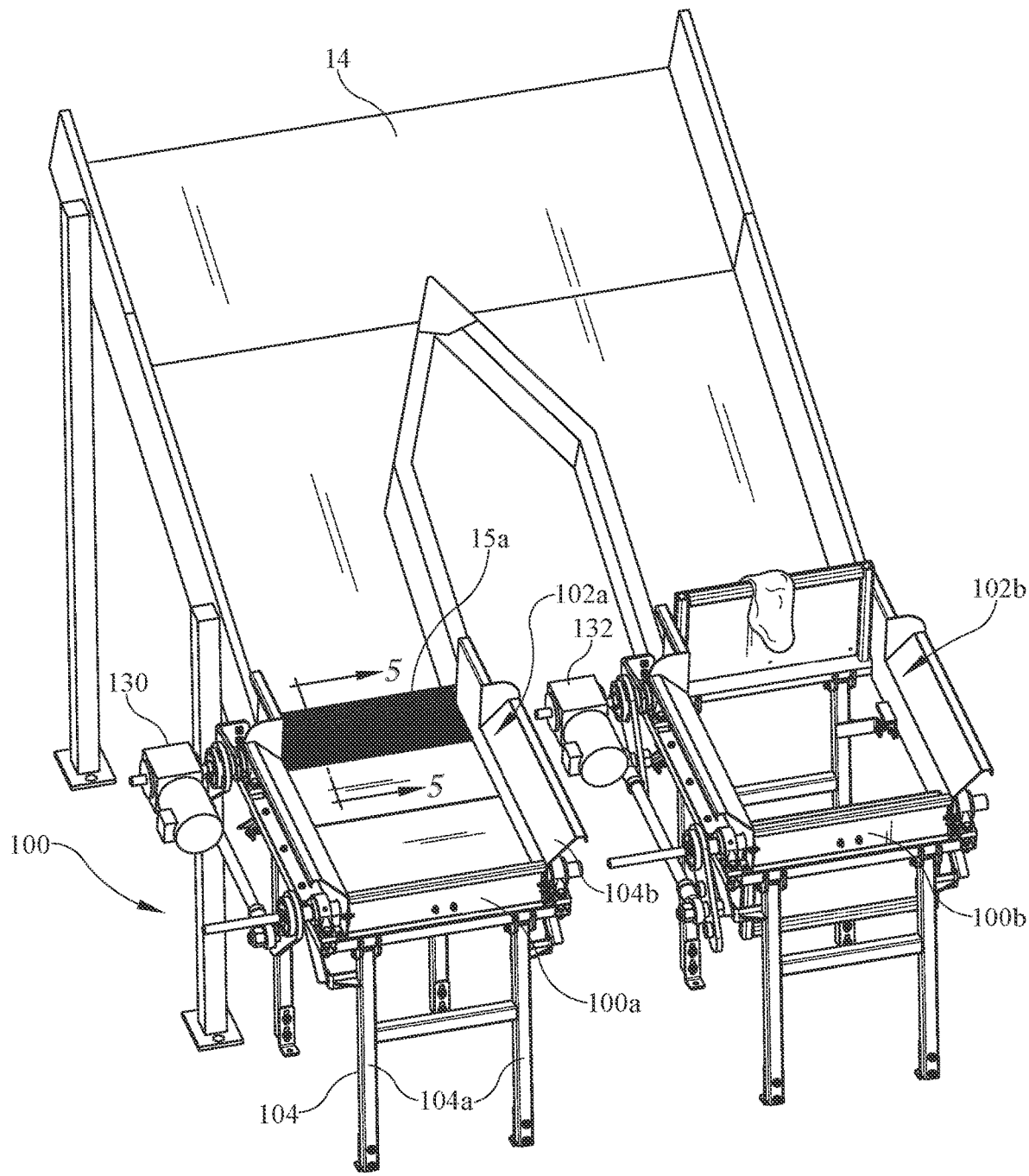
FIG. 4 is an alternate perspective view of an upstream conveyor and the exemplary trapdoor rejection subsystem of FIG. 1, but with certain components removed.

FIG. 4 is an alternate perspective view of an upstream conveyor 14 and the exemplary trapdoor rejection subsystem 100 of FIG. 1, but the place conveyor 16, the first robot singulator 20, the second robot singulator 22, and the framework supporting the first robot singulator 20 and the second robot singulator 22 have been removed to better illustrate other components of the trapdoor rejection subsystem 100.

Figure 5:
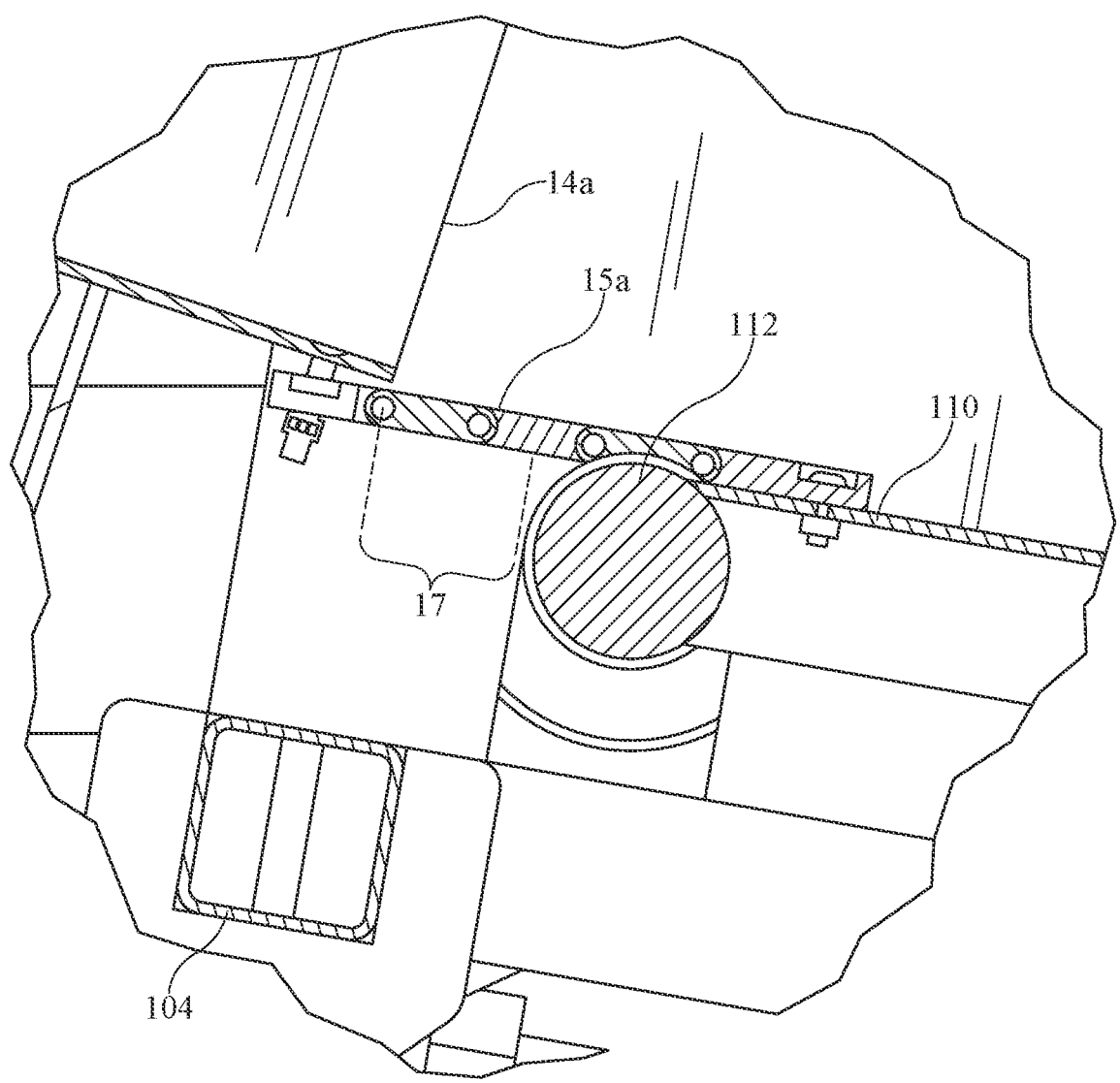
FIG. 5 is a sectional view of the upstream conveyor and the exemplary trapdoor rejection subsystem taken along line 5-5 of FIG. 4.

FIG. 5 is a sectional view of the upstream conveyor and the exemplary trapdoor rejection subsystem taken along line 5-5 of FIG. 4.

Referring now to FIGS. 1, 4, and 5, in this exemplary embodiment, the first trapdoor rejection mechanism 100a and the second trapdoor rejection mechanism 100b are positioned so that the first door 110 of each trapdoor rejection mechanism 100a, 100b is positioned adjacent to the distal end 14a of the upstream conveyor 14. As a result of such orientation, when the first trapdoor rejection mechanism 100a or the second trapdoor rejection mechanism 100b is transitioned to the open position, the first door 110 is in a vertical, upwardly extending position which effectively defines a wall that blockades and prevents upstream parcels located on the upstream conveyor 14 from inadvertently transitioning off of the upstream conveyor 14 and through the trapdoor rejection subsystem 100. As a further result of such orientation, when the first trapdoor rejection mechanism 100a or the second trapdoor rejection mechanism 100b is transitioned to the open position, the second door 120 of the mechanism is in a vertical, downwardly extending position, which prevents an unconveyable parcel from inadvertently being catapulted onto the place conveyor 16.

Referring again to FIGS. 1 and 6, following the transition of the first trapdoor rejection mechanism 100a to the open position, the controller 40 communicates instructions (or signals) which actuate the actuator 130 to return the first trapdoor rejection mechanism 100a back to the closed position so that upstream parcels subsequently directed to the first picking area 102a from the upstream conveyor 14 can be transferred to the place conveyor 16 or rejected in the above-described manner. Similarly, following the transition of the second trapdoor rejection mechanism 100b to the open position, the controller 40 communicates instructions (or signals) which actuate the actuator 132 of the second trapdoor rejection mechanism 100b to return the second trapdoor rejection mechanism 100b to the closed position so that upstream parcels subsequently directed to the second picking area 102b from the upstream conveyor 14 can be transferred to the place conveyor 16 or rejected in the above-described manner. The communication of instructions (or signals) by the controller 40 to return the first trapdoor rejection mechanism 100a or the second trapdoor rejection mechanism 100b to the closed position may occur automatically (e.g., after a predetermined time period after being transitioned to the open position) or after a verification step performed by the vision and control subsystem 30, as further described below.

As evidenced by the second trapdoor rejection mechanism 100b in FIG. 4, as the first door 110 of each respective trapdoor rejection mechanism 100a, 100b is transitioned to the open position, parcels of flexible construction (e.g., flexible plastic or "poly" bags) may be raised and subsequently become "hung" on (i.e., rest on top of) the first door 110. As the respective trapdoor rejection mechanisms 100a, 100b are returned to the closed position, parcels hung on the first door 110 may inadvertently fall below the trapdoor rejection subsystem 100 or prevent the first door 110 and the second door 120 from closing correctly. Therefore, prior to communicating instructions to transition the first trapdoor rejection mechanism 100a or the second trapdoor rejection mechanism 100b back to the closed position, the vision and control subsystem 30 preferably verifies that no parcels are hung and that the doors of the respective trapdoor rejection mechanisms 100a, 100b can be closed without issue. To this end, and in this exemplary embodiment, the conveyor system 10 further includes a sensor 150 (FIGS. 1 and 6), such as a photoelectric sensor, to detect when a parcel becomes hung in the above-described manner. The sensor 150 is configured and positioned to detect instances in which a parcel rests on top of the first door 110 of the respective trapdoor rejection mechanisms 100a, 100b when in the open position and obtain readings indicative of the same. In this exemplary embodiment, each respective trapdoor rejection mechanism 100a, 100b is provided with its own sensor, although only a single sensor 150 is shown in the drawings. Accordingly, in this exemplary embodiment, the sensor 150 actually comprises multiple sensors that are distributed throughout the conveyor system 10. In an alternative embodiment, instead of a photoelectric sensor, the sensor 150 comprises one or more cameras 52, 54 of the vision and control subsystem 30.

Referring now specifically to FIG. 6, as shown, the sensor 150 is operably connected to the vision and control subsystem 30, such that readings obtained by the sensor 150 are transmitted to a controller 40 of the vision and control subsystem 30 for subsequent processing. The sensor 150 may be selectively activated to obtain readings in response to instructions (or signals) communicated from the controller 40 of the vision and control subsystem 30 or obtain readings substantially continuously. In the event readings from the sensor 150 are determined by the controller 40 to indicate that a parcel is hung on one of the respective trapdoor rejection mechanisms 100a, 100b within the conveyor system 10, the controller 40 is configured to generate an alarm to notify an operator of such occurrence. In this exemplary embodiment, the alarm generated by the controller 40 is in the form of a visual cue which is displayed on a display 170 that is operably connected to the controller 40 of the vision and control subsystem 30 and/or an audible cue which is emitted from a speaker 160 that is operably connected to the controller 40 of the vision and control subsystem 30. To verify that the trapdoor rejection mechanism 100a, 100b on which the parcel was hung can be closed without issue, the controller 40 preferably waits to communicate instructions to the actuator 130, 132 of that trapdoor rejection mechanism 100a, 100b to return to the closed position until the controller 40 receives a reading from the sensor 150 indicating that the parcel is no longer hung.

Referring now again to FIGS. 1, 4, and 5, in this exemplary embodiment, the conveyor system 10 further includes a hinge 15a, 15b which bridges a gap 17 (FIG. 5) existing between the distal end 14a of the upstream conveyor 14 and the trapdoor rejection subsystem 100 to prevent smaller parcels (e.g., flat envelops) from falling through the gap 17 during operation of the conveyor system 10. In this exemplary embodiment, the hinge 15a, 15b actually comprises two separate hinges: a first hinge 15a which is secured to and extends between the distal end 14a of the upstream conveyor 14 and the first trapdoor rejection mechanism 100a; and a second hinge 15b which is secured to and extends between the distal end 14a of the upstream conveyor 14 and the second trapdoor rejection mechanism 100b. As best shown in FIG. 5, in this exemplary embodiment, the first hinge 15a is secured to an underside of the distal end 14a of the upstream conveyor 14 and the first door 110 of the first trapdoor rejection mechanism 100a. Although not shown, the second hinge 15b is similarly secured with respect to the distal end 14a of the upstream conveyor and the second trapdoor rejection mechanism 100b. In this exemplary embodiment, the length of the first hinge 15a and the second hinge 15b, in combination, is coextensive with the length of the gap 17 existing between the distal end 14a of the upstream conveyor 14 and the trapdoor rejection subsystem 100. Alternative embodiments are, however, contemplated in which the length of the first hinge 15a and the second hinge 15b, in combination, only extends a portion of the length of the gap 17, while still effectively preventing parcels from falling through the gap 17. Various hinge types and constructions may be utilized for the first hinge 15a and the second hinge 15b. For example, as shown in FIGS. 4 and 5, in this exemplary embodiment, the first hinge 15a and the second hinge 15b are comprised of multiple interlocking segments which define a plurality of joints that may be manipulated as the trapdoor rejection mechanism 100a, 100b to which it is secured opens and closes. In such embodiments, the first hinge 15a and the second hinge 15b may be constructed of a rigid plastic or flexible rubber. In alternative embodiments, the first hinge 15a and the second hinge 15b may be constructed in a similar manner to the transfer plate that is described in U.S. Pat. No. 10,654,652, which is incorporated herein by reference.

Although the exemplary embodiments described above with reference to FIGS. 1, 2A, 2B, and 3-6 describes the incorporation of the trapdoor rejection subsystem 100 of the present invention into a conveyor system that makes use of first and second six-axis robots, the invention is not limited to such a configuration. Rather, the trapdoor rejection subsystem 100 of the present invention could be incorporated into various other conveyor systems, including conveyor systems which utilize only a single robot singulator, without departing from the spirit or scope of the present invention. Suitable, alternative conveying systems in which the trapdoor rejection subsystem 100 may be incorporated include, but is not limited to, the conveyor system described in U.S. Pat. No. 10,646,898 (which uses a single robot for singulation). Additionally, although the trapdoor rejection subsystem 100 is primarily referred to herein in the context of comprising multiple trapdoor rejection mechanisms 100a, 100b, it is appreciated that, in alternative embodiments, the trapdoor rejection subsystem 100 may include only a single trapdoor rejection mechanism and still fall within the spirit and scope of the present invention. Furthermore, although the upstream conveyor 14 is sometimes referred to herein and illustrated within the drawings as a bulk feed chute, it should be appreciated that the upstream conveyor 14 is not so limited. Rather, in some embodiments, instead of a bulk feed chute, the upstream conveyor 14 comprises a different conveying mechanism, such as one or more belt or roller conveyors.

One of ordinary skill in the art will recognize that additional embodiments and implementations are also possible without departing from the teachings of the present invention. This detailed description, and particularly the specific details of the exemplary embodiment and implementation disclosed herein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A conveyor system, comprising:
one or more robot singulators;
an upstream conveyor for carrying a bulk flow of parcels;

a trapdoor rejection mechanism configured to transition between a closed position to support parcels from the bulk flow of parcels directed to the trapdoor rejection mechanism and an open position to allow passage of parcels from the bulk flow of parcels to pass through the trapdoor rejection mechanism, the trapdoor rejection mechanism defining a picking area when in the closed position from which parcels from the bulk flow of parcels can be engaged and transferred by the one or more robot singulators;

a place conveyor for receiving parcels transferred by the one or more robot singulators;

a vision and control subsystem operably connected to the one or more robot singulators and the trapdoor rejection mechanism, the vision and control subsystem including a camera for acquiring one or more images of the picking area and any parcels from the bulk flow of parcels located in the picking area, and a controller including a processor for executing instructions stored in a memory component to (i) receive and process image data corresponding to the one or more images of the picking area acquired by the camera to determine whether a parcel in the picking area is conveyable or unconveyable, (ii) communicate instructions to the one or more robot singulators which cause the one or more robot singulators to engage and transfer the parcel in the picking area from the picking area to the place conveyor in response to a determination that the parcel in the picking area is conveyable, and (iii) communicate instructions which cause the trapdoor rejection mechanism to transition from the closed position to the open position in response to a determination that the parcel in the picking area is unconveyable;

at least one of a display and a speaker; and a sensor positioned to detect a presence of a parcel resting on top of a door of the trapdoor rejection mechanism when the trapdoor rejection mechanism is in the open position;

wherein the sensor and the at least one of the display and the speaker are each operably connected to the vision and control subsystem, and wherein the memory component further includes instructions, which, when executed by the processor, cause the controller to (iv) communicate instructions which cause the display to display a visual cue and/or the speaker to emit an audible cue in response to the controller receiving a reading from the sensor indicating the presence of the parcel resting on top of the door of the trapdoor rejection mechanism when the trapdoor rejection mechanism is in the open position.

2. The conveyor system according to claim 1, and further comprising:

a hinge secured to the upstream conveyor and the trapdoor rejection mechanism, the hinge bridging a gap between the upstream conveyor and the trapdoor rejection mechanism.

3. The conveyor system according to claim 2, wherein the hinge is coextensive with a length of the gap between the upstream conveyor and the trapdoor rejection mechanism.

4. The conveyor system according to claim 1, wherein the sensor is a photoelectric sensor.

5. The conveyor system according to claim 1, wherein the sensor is the camera of the vision and control subsystem.

6. A conveyor system, comprising:

one or more robot singulators;

an upstream conveyor for carrying a bulk flow of parcels;

a trapdoor rejection mechanism configured to transition between a closed position to support parcels from the bulk flow of parcels directed to the trapdoor rejection mechanism and an open position to allow passage of parcels from the bulk flow of parcels to pass through the trapdoor rejection mechanism, the trapdoor rejection mechanism defining a picking area when in the closed position from which parcels from the bulk flow of parcels can be engaged and transferred by the one or more robot singulators;

a place conveyor for receiving parcels transferred by the one or more robot singulators; and a vision and control subsystem operably connected to the one or more robot singulators and the trapdoor rejection mechanism, the vision and control subsystem including a camera for acquiring one or more images of the picking area and any parcels from the bulk flow of parcels located in the picking area, and a controller including a processor for executing instructions stored in a memory component to (i) receive and process image data corresponding to the one or more images of the picking area acquired by the camera to determine whether a parcel in the picking area is conveyable or unconveyable, (ii) communicate instructions to the one or more robot singulators which cause the one or more robot singulators to engage and transfer the parcel in the picking area from the picking area to the place conveyor in response to a determination that the parcel in the picking area is conveyable, and (iii) communicate instructions which cause the trapdoor rejection mechanism to transition from the closed position to the open position in response to a determination that the parcel in the picking area is unconveyable;

wherein the trapdoor rejection mechanism includes:

a first door mounted to a first shaft;

a second door mounted to a second shaft; and one or more actuators operably connected to the vision and control subsystem and configured to be actuated in response to instructions communicated from the controller, each actuator of the one or more actuators operably connected to the first shaft or the second shaft;

wherein, in use, the first shaft and the second shaft of the trapdoor rejection mechanism are rotated in response to actuation of the one or more actuators to cause the trapdoor rejection mechanism to transition between the open position and the closed position; and wherein the first door and the second door of the trapdoor rejection mechanism define a surface for supporting parcels from the bulk flow of parcels when the trapdoor rejection mechanism is in the closed position.

7. The conveyor system according to claim 6, wherein the one or more actuators comprises a single actuator.

8. The conveyor system according to claim 7, wherein the trapdoor rejection mechanism further includes:

a first pivot arm mounted to the first shaft, such that, in use, the first shaft is rotated in response to rotation of the first pivot arm;

a second pivot arm mounted to the second shaft, such that, in use, the second shaft is rotated in response to rotation of the second pivot arm; and a rod connecting the first pivot arm to the second pivot arm, such that, in use, rotation of the first pivot arm results in simultaneous rotation of the second pivot arm.

9. The conveyor system according to claim 6, wherein the trapdoor rejection mechanism further includes a frame to which the first shaft and the second shaft are mounted, the frame defining a wall that at least partially surrounds the first door and the second door of the trapdoor rejection mechanism.

10. The conveyor system according to claim 6, wherein the first door and the second door are positioned opposite of each other, and wherein the first door extends upwardly when the trapdoor rejection mechanism is in the open position, and the second door extends downwardly when the trapdoor rejection mechanism is in the open position.

11. The conveyor system according to claim 10, wherein the first door defines a wall that blockades parcels from the bulk flow of parcels on the upstream conveyor when the trapdoor rejection mechanism is in the open position.

12. A conveyor system, comprising:
   one or more robot singulators;
   an upstream conveyor for carrying a bulk flow of parcels;
   a first trapdoor rejection mechanism configured to transition between a closed position to support parcels from the bulk flow of parcels directed to the first trapdoor rejection mechanism and an open position to allow passage of parcels from the bulk flow of parcels to pass through the first trapdoor rejection mechanism, the first trapdoor rejection mechanism defining a picking area when in the closed position from which parcels from the bulk flow of parcels can be engaged and transferred by the one or more robot singulators;
   a place conveyor for receiving parcels transferred by the one or more robot singulators; and
   a vision and control subsystem operably connected to the one or more robot singulators and the first trapdoor rejection mechanism, the vision and control subsystem including
      a camera for acquiring one or more images of the picking area and any parcels from the bulk flow of parcels located in the picking area, and
      a controller including a processor for executing instructions stored in a memory component to (i) receive and process image data corresponding to the one or more images of the picking area acquired by the camera to determine whether a parcel in the picking area is conveyable or unconveyable, (ii) communicate instructions to the one or more robot singulators which cause the one or more robot singulators to engage and transfer the parcel in the picking area from the picking area to the place conveyor in response to a determination that the parcel in the picking area is conveyable, and (iii) communicate instructions which cause the first trapdoor rejection mechanism to transition from the closed position to the open position in response to a determination that the parcel in the picking area is unconveyable;
   a second trapdoor rejection mechanism operably connected to the vision and control subsystem and configured to transition between a closed position to support parcels from the bulk flow of parcels directed to the second trapdoor rejection mechanism and an open position to allow passage of parcels from the bulk flow of parcels directed to the second trapdoor rejection mechanism to pass through the second trapdoor rejection mechanism;
   wherein a distal end of the upstream conveyor is split into a first section for directing parcels to the first trapdoor rejection mechanism and a second section for directing parcels to the second trapdoor rejection mechanism.

13. A trapdoor rejection mechanism for a conveyor system, comprising:
   a first door mounted to a first shaft;
   a second door mounted to a second shaft; and
   one or more actuators, with each actuator of the one or more actuators operably connected to the first shaft or the second shaft;
   wherein, in use, the first shaft and the second shaft are rotated in response to actuation of the one or more actuators to transition the trapdoor rejection mechanism between a closed position in which the first door and the second door define a surface for supporting a parcel and an open position to allow passage of the parcel through the trapdoor rejection mechanism.

14. The trapdoor rejection mechanism according to claim 13, wherein the one or more actuators comprises a single actuator.

15. The trapdoor rejection mechanism according to claim 14, and further comprising:
   a first pivot arm mounted to the first shaft, such that, in use, the first shaft is rotated in response to rotation of the first pivot arm;
   a second pivot arm mounted to the second shaft, such that, in use, the second shaft is rotated in response to rotation of the second pivot arm; and
   a rod connecting the first pivot arm to the second pivot arm, such that, in use, rotation of the first pivot arm results in simultaneous rotation of the second pivot arm.

16. The trapdoor rejection mechanism according to claim 13, and further comprising a frame to which the first shaft and the second shaft are mounted, wherein the frame defines a wall that, at least partially, surrounds the first door and the second door.

17. The trapdoor rejection mechanism according to claim 13, wherein the first door and the second door are positioned opposite of each other, and wherein the first door and the second door move in opposite directions in response to the first shaft and the second shaft being rotated in the same rotational direction.

18. The trapdoor rejection mechanism according to claim 17, wherein the first door extends upwardly when the trapdoor rejection mechanism is in the open position, and the second door extends downwardly when the trapdoor rejection mechanism is in the open position.

19. The trapdoor rejection mechanism according to claim 13, and further comprising:
   a camera for acquiring one or more images of the trapdoor rejection mechanism and any parcels positioned on the first door or the second door of the trapdoor rejection mechanism; and
   a controller including a processor for executing instructions stored in a memory component to (i) receive and process image data corresponding to the one or more images of the trapdoor rejection mechanism acquired by the camera to determine whether one or more parcels positioned on the first door or the second door of the trapdoor rejection mechanism is unconveyable, and (ii) communicate instructions which cause the trapdoor rejection mechanism to transition from the closed position to the open position in response to a determination that one or more parcels is unconveyable.

* * * * *